United States Patent [19]

Okuda

[11] Patent Number: 5,079,282
[45] Date of Patent: Jan. 7, 1992

[54] WEATHER-RESISTANT POLYACETAL RESIN COMPOSITION

[75] Inventor: Sadatsugu Okuda, Shizuoka, Japan

[73] Assignee: Polyplastics Co., Ltd., Osaka, Japan

[21] Appl. No.: 377,453

[22] Filed: Jul. 10, 1989

[30] Foreign Application Priority Data

Jul. 14, 1988 [JP] Japan ................. 63-175968

[51] Int. Cl.⁵ ............... C08K 5/3435; C08K 5/3492; C08K 5/521
[52] U.S. Cl. ..................... 524/91; 524/359; 524/513; 525/170; 525/400; 525/401
[58] Field of Search ............... 524/91, 359, 513; 525/170, 400, 401

[56] References Cited

U.S. PATENT DOCUMENTS

| | | | |
|---|---|---|---|
| 4,427,823 | 1/1984 | Inagaki et al. | 524/833 |
| 4,464,435 | 8/1984 | Hattori et al. | 428/409 |
| 4,477,614 | 10/1984 | Dexter | 524/91 |
| 4,521,488 | 6/1985 | Hattori et al. | 428/409 |
| 4,565,850 | 1/1986 | Prevorsek et al. | 525/439 |
| 4,717,745 | 1/1988 | Ishii et al. | 524/91 |
| 4,730,015 | 3/1988 | Ikenaga et al. | 524/91 |
| 4,814,397 | 3/1989 | Novak | 525/401 |

FOREIGN PATENT DOCUMENTS 2439803 5/1980 European Pat. Off.
0172691 2/1986 European Pat. Off.

OTHER PUBLICATIONS

Patent Abstracts of Japan, vol. 5, No. 79 (C-056), May 23, 1981.
Patent Abstracts of Japan, vol. 1, No. 10 (C-003) Mar. 18, 1977.
Patent Abstracts of Japan, vol. 2, No. 136 (C-027) Nov. 11, 1978.

*Primary Examiner*—Paul R. Michl
*Assistant Examiner*—Christopher P. Rogers
*Attorney, Agent, or Firm*—Nixon & Vanderhye

[57] ABSTRACT

A polyacetal resin composition is improved in the weather-resistance and comprises:
(A) a polyacetal resin,
(B) 0.01 to 5% by weight (based on the whole composition) of a weathering (light) stabilizer and
(C) 0.01 to 10% by weight (based on the whole composition) of an acrylic oligomer of a polyester type.

6 Claims, No Drawings

WEATHER-RESISTANT POLYACETAL RESIN COMPOSITION

FIELD OF THE INVENTION

The present invention relates generally to a polyacetal resin composition exhibiting excellent weather-resistant properties. Particularly, the present invention provides a polyacetal resin composition having remarkably improved weather-resistant properties by the addition of a weathering (light) stabilizer and a polyester type acrylic oligomer and a molded article thereof.

BACKGROUND AND SUMMARY OF THE INVENTION

Polyacetal resins are well known and have been used in a number of end-use applications as an engineering resin due to its excellent physical and chemical characteristics (such as mechanical electrical characteristics, as well as its resistance to chemicals or heat. As the field in which a polyacetal resins are utilized expand, however, more stringent and/or special properties for polyacetal resins are needed.

One of such special properties is improved weathering (light) resistance. Particularly, exterior automotive trims or components of electric appliances or business machines which are made of a polyacetal resin tend to determinate when exposed to "weathering" conditions, such as sunlight, wind and rain, fluorescent lamps or contact with the atmosphere. weathering of polyacetal resins is manifested in discoloration, disappearance of gloss with reduced surface smoothness, a reduction in the mechanical properties and crack generation on the surface of molded articles of the resin. In order to inhibit these troubles, it has been proposed to improve the weathering resistance of polyacetal resins by the addition of various stabilizers.

Although some improvement is achieved by incorporating stabilizers in polyacetal resins according to the prior art, molded articles polyacetal resin do not always exhibit satisfactory results in terms of appearance (crack or gloss) and/or mechanical properties after prolonged exposure to sunlight (ultraviolet light). Therefore, polyacetal resins exhibiting further improvements in weather stability is required in many cases.

In order to fulfill this requirement, it has been attempted to increase the amount of the weathering stabilizer added to the polyacetal base resins. However, merely increasing the amount of the stabilizer results in only a limited improvement. In addition, excessive amounts of stabilizer is problematic or disadvantageous in that the mechanical properties (such as tensile strength or flexural strength) of the polyacetal resin are reduced and the stabilizer may "bleed" into the surfaces of molded articles. In addition, excess the stabilizer tends to adhere or build-up on the surfaces of molds (i.e., so-called-mold deposits) during molding of the resin. This invention affects the dimensional accuracy and/or appearance of the resulting molded article. As a result mold must be cleaned more frequently thereby lowering molding efficiency that other various troubles such as a poor appearance of a molding due to bleeding of a stabilizer occur more often.

The present invention relates to a weather-resistant polyacetal resin composition comprising
(A) a polyacetal base resin,
(B) between 0.01 to 5% by weight (based on the whole composition) of a weathering (light) stabilizer, and
(C) between 0.01 to 10% by weight (based on the whole composition) of an acrylic terminated polyester oligomer.

Further aspects of this invention will become more clear after consideration is given to the following detailed description thereof.

DETAILED DESCRIPTION OF THE PREFERRED EMBODIMENTS

The polyacetal base resin (A) to be used in the compositions of the present invention is a polymer comprised mainly of repeating oxymethylene units ($-CH_2O-$). The polyacetal base resin and may be a polyoxymethylene homopolymer or a copolymer, terpolymer or block copolymer comprised of oxymethylene units and a small amount of other constituent units. Furthermore, the polyacetal resin may have linear, branched or crosslinked structures. The degree of polymerization of the polyacetal resin is not particularly limited.

According to the present invention, it is preferable to use as component (B) of the following stabilizers ① benzotriazoles, ② benzophenones, ③ aromatic benzoates, ④ cyanoacrylates, ⑤ oxanilides and ⑥ hindered amines.

Examples of the benzotriazoles ① include 2-(2'-hydroxy-5'-methylphenyl)benzotriazole, 2-(2'-hydroxy-3',5'-di-t-butylphenyl)benzotriazole, 2-(3,5-di-t-amyl-2-hydroxyphenyl)benzotriazole, 2-(2'-hydroxy-3', 5'-diisoamylphenyl)benzotriazole, 2-[2-hydroxy-3,5-bis-(α,α-dimethylbenzyl)phenyl]benzotriazole and 2-(2'-hydroxy-4'-octoxyphenyl)benzotriazole.

Examples of the benzophenones ② include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone and 2-hydroxy-4-oxybenzylbenzophenone.

Examples of the aromatic benzoates ③ include p-t-butylphenyl salicylate and p-octylphenyl salicylate.

Examples of the cyanoacrylates ④ include 2-ethylhezyl 2-cyano-3,3'-diphenylacrylate and ethyl 2-cyano-3,3'-diphenylacrylate.

Examples of the oxanilides ⑤ include N-(2-ethylphenyl)-N'-(2-ethoxy-5-t-butylphenyl)oxamide and N-(2-ethylphenyl)-N'-(2-ethoxyphenyl)oxamide.

The hindered amine ⑥ that may be used in the present invention is a piperidine derivative having a strically hindering group and examples thereof include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethylpiperidyl) sebacate, bis(2,2,6,6-tetramethyl-4-piperidyl) terephthalate, 1,2-bis(2,2,6,6-tetramethyl-4-piperidyloxy)ethane, bis(2,2,6,6-tetramethyl-4-piperidiyl) hexamethylene-1,6-dicarbamate, bis(1-methyl-2,2,6,6-tetramethyl-4-piperidyl) adipate and tris(2,2,6,6-tetramethyl-4-piperidyl) benzene-1,3,5-tricarboxylate.

Further, high-molecular weight polycondensates of piperidine derivatives such as polycondensate of dimethyl succinate with 1-(2-hydroxyethyl)-4-hydroxy-2,2,6,6-tetramethylpiperidine are also useful.

According to the present invention, it is preferred to use one or more members selected from among the stabilizers described above, still more preferably any of the above stabilizers ① to ⑤ together with a hindered amine ⑥.

The weathering stabilizer is used in an amount between 0.01 to 5% by weight, preferably 0.02 to 3% by weight based on the composition. When the amount of the stabilizer (B) is too small, an insufficient stabilizing effect can be obtained. On the other hand, excessive amounts of stabilizers will not only be uneconomical, but also may cause the above-mentioned problems or disadvantages (for example, lowering of mechanical properties, mold deposits, etc.) or bring about other adverse effects.

The present invention is especially characterized by incorporating an acrylic terminated polyester oligomer as a compound (C) in addition to the weathering stabilizer.

The acrylic terminated polyester oligomer that may be used in the compositions of the present invention is an ester of a dihydric or higher alcohol with a dibasic or higher carboxylic acid and is terminated with a residue of an acrylic acid or a derivative thereof. Particularly, it is preferred to use a polyester oligomer represened by the general formula (I):

$$A-(M-N)_n-M-A \qquad (I)$$

wherein
A: a residue of acrylic acid or a derivative thereof,
B: a dihydric alcohol residue,
M: a dicarboxylic acid residue, and
n: 1 to 100.

Preferred examples of the dihydric alcohol constituting the acrylic terminated polyester oligomer include ethylene glycol, diethylene glycol, triethylene glycol, tetraethylene glycol, polyethylene glycol, propylene glycol, dipropylene glycol, polypropylene glycol, butanediol (1,3-, 1,4- or 2,3-), 1,6-hexanediol, octanediol, decanediol, neopentyl glycol, hydrogenated bisphenol A, cyclohexane-1,4-dimethanol, m-xylylene glycol, diethanolamine, dibromoneopentyl glycol, 1,5-pentanediol, trimethylpentanediol, bisphenol dioxyethyl ether, bisphenol dioxypropyl ether, hexylene glycol, polybutadienediol, 1,4-cyclohexanediol, chloropropylene glycol, 2,2-diethylpropanediol and 2-ethyl-1,4-butanediol.

Preferred examples of trihydric or higher alcohols include glycerin, trimethylolmethane, trimethylolethane, trimethylolpropane, 1,2,6-hexanetriol, tris(2-hydroxyethyl) isocyanurate, xylitol, trimethanolamine, triethanolamine, dulcitol, mannitol, pentaerythritol, sorbitol, erythritol, arabitol, mono- (di- or tri-)polyethylene glycol ether of glycerin and mono- (di- or tri-)polypropylene glycol ether of glycerin. Particularly, it is preferable to use a dihydric alcohol, still preferably ethylene glycol, diethylene glycol, triethylene glycol, tetraethylene glycol, propylene glycol, dipropylene glycol, neopentyl glycol, 1,3-butanediol, 1,6-hexanediol, 1,4-butanediol, 1,5-pentanediol or an ester-forming derivative thereof.

The polycarboxylic acid constituting the acrylic terminated polyester oligomer includes dibasic carboxylic acids and anhydrides thereof such as succinic, maleic, citraconic, itaconic, muconic hexahydrophthalic, tetrahydrophthalic, phthalic, Himic (3,6-endomethylenetetrahydrophthalic), Endic(3,6-endoisopropylidenetetrahydrophthalic), tetrachlorophthalic, tetrabromophthalic and HET (1,4,5,6,7,7-hexachloro-5-norbornene-2,3-dicarboxylic) acids and anhydrides thereof; dibasic acids such as oxalic, malonic, glutaric, adipic, sebacic, 1,12-dodecanedioic, fumaric, mesaconic, dimer, isophthalic, terephthalic, polybutadienedicarboxylic, trimethyladipic, methyleneglutaric, acetylenedicarboxylic, thiodiglycolic, thiodivaleric, sulfonyldiacetic, sulfonyldivaleric, 1,4,3,6,7,7-hexabromo-endo-5-norbornene-2,3-dicarboxylic, 2,4-benzophenonedicarboxylic, resorcinolacetic, trans-1,4-cyclohexenedicarboxylic, 1,3-(or 1,4-)tetrahydrophthalic, 1,3-(or 1,4-) 1,4-)hexahydrophthalic, α-methylitaconic, α,α-dimethylitaconic, α-ketoglutaric, 2,2-(or 2,3-)dimethylsuccinic, 2-methylsuccinic, hexylsuccinic, pimelic, suberic, azelaic, 3,3-(or 2,2-)dimethylglutaric, 3,3-(or 2,2-)diethylglutaric, 1,1-cyclobutadienedicarboxylic, diglycolic, malic, cyclopentanedicarboxylic, dihydrophthalic, cyclohexanedicarboxylic, α-methylglutaric and halogenated tetrahydrophthalic acids; tribasic acids such as trimellitic, aconitric, butanetricarboxylic, butenetricarboxylic, 6-methylcyclohexene-4-1,2,3-tricarboxylic acids and anhydrides thereof and tetrabasic or higher carboxylic acids such as pyromellitic, butanetetracarboxylic, benzoltetracarboxylic and naphthalenepolycarboxylic acids and anhydrides thereof. Particularly, it is preferable to use a dicarboxylic acid, still preferably succinic, adipic, sebacic, 1,12-dodecanedioic, fumaric, maleic, itachonic, mesaconic, citraconic, muconic, phthalic, 1,3-(or 1,4-)tetrahydrophthalic, 1,3-(or 1,4-)hexahydrophthalic, Himic, Endic or HET acid or anhydride or ester-forming derivative thereof.

The raw materials for the residue of acrylic acid or a derivative thereof constituting the terminal groups of the acrylic terminated polyester oligomers includes not only acrylic and methacrylic acids but also ester-forming derivatives of (meth)acrylic acid which can form an ester by ester interchange or condensation, for examples, lower alkyl esters and acyl halides of (meth)acrylic acid.

The acrylic terminated polyester oligomer to be used in the present invention can be prepared by the esterification of at least three raw materials, i.e., dihydric or higher alcohol, a dibasic or higher carboxylic acid and (meth)acrylic acid or an ester-forming derivative thereof as described above in the presence of a conventional esterification catalyst.

The amount of the acrylic terminated polyester oligomer to be added to the polyacetal base is resins between 0.01 to 10% by weight (based on the total composition weight). When too little oligomer is used, the weathering (light) resistance properties cannot be improved sufficiently. Particularly, the generation of cracks on the surface of a molding cannot be inhibited sufficiently. On the contrary, the addition of too large an amount of oligomer will exert an adverse effect on the mechanical properties and heat stability of the resin. It is preferable that the acrylic terminated polyester oligomer exhibits a viscosity of 20000 cP or below. Particularly, it is still preferable in respect mainly of processability and dispersibility that the viscosity thereof be 5000 cP or below.

When the handling of an acrylic terminated polyester oligomer is difficult owing to its high viscosity, an appropriate solvent such as a low-viscosity alcohol may be added to the oligomer as a diluent to thereby lower the viscosity thereof.

According to the present invention, an acrylic terminated polyester oligomer as described above is used together with a weathering (light) stabilizer to thereby synergistically improve the weathering (light) resistance of a polyacetal resin.

It is preferred that the compositions of the present invention further contain various known stabilizers to thereby further improve the heat stability thereof. For this purpose, it is preferable to use one or more members selected from among known antioxidants, nitrogen compounds and alkali or alkaline earth metal compounds.

The compositions of the present invention may also be arbitrarily colored by the addition of various carbon blacks or various other dyes or pigments.

The combination of a weathering (light) stabilizer with an acrylic terminated polyester oligomer according to the present invention is effective not only in imparting weathering resistance to a polyacetal resin, but also in preventing the fading or discoloration of the dye or pigment added to the resin. As a result, it is quite effective in maintaining the appearance of a colored article.

Further, the use of carbon black together with the above combination is more effective in improving the weathering (light) stability.

In order to impart desired characteristics to the composition of the present invention, one or more of various known additives may be incorporated into the composition. Examples of the additives include lubricants, nucleating agents, mold release agents, antistatic agents, other surfactants, organic polymers and organic and inorganic, fibrous, powdery, granular or flaky fillers.

The compositions of the present invention may be prepared by conventional methods for the preparation of a synthetic resin composition with equipment therefor. Namely, necessary components are mixed and kneaded and extruded with a single-or twin-screw extruder to obtain a pellet, which is then molded. Alternatively, the preparation of the composition may be carried out simultaneous with the molding thereof with a molding machine. Further, in order to facilitate the dispersion and mixing of necessary components, a part or the whole of the resinous components may be preliminarily ground prior to the mixing thereof.

The above-mentioned stabilizers and additives may be added in any arbitrary step. Of course, they may be added immediately before the production of a final molding.

The compositions of the present invention prepared by adding a specified, acrylic terminated polyester oligomer to a polyacetal resin containing a weathering (light) stabilizer is remarkably improved as compared with polyacetal resin compositions of the prior art not containing such an oligomer. That is, when exposed to ultraviolet light for a long period of time, it exhibits an improved appearance, particularly a largely prolonged crack initiation time and remarkably reduces the of lower tensile strengths and elongation without aggrevating the problems of the prior art or generating any new problems.

Accordingly, the weather-resistance pllyacetal resin composition of the present invention is favorably used for molded parts in various fields where excellent weathering resistance is required. That is, it is applicable to various uses where the exposure to an atmosphere such as sunlight, rain or wind or a fluorescent lamp lasts for a long period of time, such as interior or exterior automotive trims (such as an outer handle or an inner handle), electrical appliances, business machines such as computer, camera, various industrial parts and components, building material and piping, sundries or housewares.

The resin composition according to the present invention may be molded by any fabrication technique, such as extrusion, injection, compression, vacuum forming, blowing and expansion molding.

EXAMPLES

The present invention will be described by referring to the following non-limiting Examples, In the Examples, the characteristics of each composition such as weathering resistance are evaluated as follows:

1) CRACK INITIATION TIME

A test piece was irradiated with ultraviolet light by the use of a weatherometer (mfd. by Suga Test Instruments Co., Ltd., WBL-SUN-HCH type) under fading conditions at 83° C. The surface of the test piece was observed with a 5×magnifier to determine whether crack was generated on the surface or not. Thus, the time which had elapsed until crack was observed for the first time was determined and designated as the crack initiation time. The larger then value the more excellent the weathering resistance.

2) TENSILE STRENGTH AND ELONGATION

A test piece was examined for tensile strength and elongation according to an ordinary method (ASTM-D 638) both before the above irradiation in a weatherometer and after it.

3) CHANGE OF APPEARANCE

The color and gloss of a test piece after the above irradiation in a weatherometer for 600 hours were compared with those before the irradiation to evaluate the changes thereof according to five ratings. The smaller the value the less the change, i.e., the more slight the lowering in gloss or discoloration.

EXAMPLES 1 TO 14 AND COMPARATIVE EXAMPLES 1 TO 11

As shown in Table 1, a polyacetal resin (A) (a product of Polyplastic Co., Ltd., trade name: Duracon (M90)), a weathering (light) stabilizer (B) and an acrylic oligomer of a polyester type (C) [a product of Toagosei Chemical Industry Co., Ltd., trade name: Aronix] were mixed with each other and melt-kneaded and pelletized with a 30-mm twin-screw extruder to obtain a pellet. This pellet was molded into a test piece with an injection machine. The weathering resistance and other characteristics of the test piece were determined and evaluated. For comparison, compositions prepared by the addition of either a weathering (light) stabilizer (B) or an acrylic oligomer of a polyester type (C) were also evaluated in a similar manner to the one described above.

TABLE 1

| No. | (A) polyacetal resin (% by wt.) | (B) weathering (light) stabilizer note 1 (% by wt.) | (B) weathering (light) stabilizer note 2 (% by wt.) | (C) acrylic oligomer of a polyester type note 3 (% by wt.) | carbon black (% by wt.) | Crack initiation time | Tensile strength and elongation (strength kg/cm² - elongation %) before irradn. | after irradn. for 600 hours | after irradn. for 1000 hours | Appearance (600) hours |
|---|---|---|---|---|---|---|---|---|---|---|
| Example | | | | | | | | | | |
| 1 | 98.7 | B-1 (0.3) | — | C-1 (1.0) | — | 380 | 625-68 | 620-28 | 610-18 | 2 |
| 2 | 98.7 | B-1 (0.3) | — | C-2 (1.0) | — | 360 | 620-70 | 621-26 | 611-19 | 2 |
| 3 | 98.7 | B-1 (0.3) | — | C-3 (1.0) | — | 360 | 628-60 | 619-25 | 605-18 | 2 |
| 4 | 98.7 | B-2 (0.3) | — | C-1 (1.0) | — | 320 | 631-67 | 630-25 | 608-18 | 2 |
| 5 | 98.7 | B-3 (0.3) | — | C-1 (1.0) | — | 330 | 624-68 | 626-25 | 610-19 | 2 |
| 6 | 98.7 | — | B-4 (0.3) | C-1 (1.0) | — | 340 | 620-70 | 615-27 | 613-20 | 2 |
| 7 | 98.7 | — | B-5 (0.3) | C-1 (1.0) | — | 380 | 623-71 | 615-26 | 610-21 | 2 |
| 8 | 98.4 | B-1 (0.3) | B-4 (0.3) | C-1 (1.0) | — | 580 | 620-71 | 622-32 | 625-24 | 1 |
| 9 | 97.9 | B-1 (0.3) | B-4 (0.3) | C-1 (1.0) | (0.5) | 980 | 625-55 | 635-50 | 632-38 | 1 |
| 10 | 98.4 | B-3 (0.3) | B-5 (0.3) | C-1 (1.0) | — | 600 | 620-72 | 618-33 | 610-25 | 2 |
| 11 | 99.2 | B-1 (0.3) | — | C-2 (0.5) | — | 340 | 625-65 | 610-26 | 595-18 | 2 |
| 12 | 97.7 | B-1 (0.3) | — | C-2 (2.0) | — | 400 | 618-73 | 620-32 | 611-20 | 2 |
| 13 | 98.4 | B-1 (0.6) | — | C-1 (1.0) | — | 420 | 622-70 | 620-30 | 615-21 | 2 |
| 14 | 98.4 | — | B-4 (0.6) | C-1 (1.0) | — | 400 | 618-71 | 612-29 | 608-21 | 2 |
| Comp. Example | | | | | | | | | | |
| 1 | 99.7 | B-1 (0.3) | — | — | — | 260 | 637-61 | 615-20 | 510-13 | 3 |
| 2 | 99.4 | B-1 (0.6) | — | — | — | 300 | 630-64 | 619-22 | 520-14 | 3 |
| 3 | 99.7 | B-2 (0.3) | — | — | — | 220 | 635-60 | 595-19 | 501-11 | 5 |
| 4 | 99.7 | B-3 (0.3) | — | — | — | 240 | 635-81 | 613-21 | 515-13 | 4 |
| 5 | 99.7 | — | B-4 (0.3) | — | — | 240 | 633-62 | 610-21 | 508-13 | 4 |
| 6 | 99.4 | — | B-4 (0.6) | — | — | 300 | 623-65 | 610-23 | 530-14 | 3 |
| 7 | 99.7 | — | B-5 (0.3) | — | — | 260 | 632-63 | 591-19 | 511-14 | 4 |
| 8 | 99.4 | B-1 (0.3) | B-4 (0.3) | — | — | 380 | 630-63 | 620-25 | 540-17 | 2 |
| 9 | 98.9 | B-1 (0.3) | B-4 (0.3) | — | (0.5) | 740 | 631-48 | 635-42 | 630-26 | 1 |
| 10 | 99.4 | B-3 (0.3) | B-5 (0.3) | — | — | 400 | 628-62 | 625-26 | 560-18 | 2 |
| 11 | 99.0 | — | — | C-1 (1.0) | — | 160 | 640-70 | 610-20 | 490-10 | 5 |

Note 1 B-1: 2-(3,5-di-t-amyl-2-hydroxyphenyl)-benzotriazole
B-2: 2-[2-hydroxy-3,5-bis(α,α-dimethylbenzyl)-phenyl]benzotriazole
B-3: 2-hydroxy-4-oxybenzylbenzophenone Note 2 B-4: bis(2,2,6,6-tetramethyl-4-piperidyl) sebacate
B-5: polycondensate of dimethyl succinate with 1-(2-hydroxyethyl)-4-hydroxy-2,2,6,6-tetramethyl-piperidine Note 3 C-1: Aronix M6300 (trade name)
average viscosity of 150 cP/25° C.
both terminated with methacrylic acid
constituents: methacrylic acid/dihydric alcohol/dicarboxylic acid C-2: Aronix M6100 (trade name)
average viscosity of 350 cP/25° C.
both terminated with acrylic acid
constituents: acrylic acid/dihydric alcohol/dicarboxylic acid C-3: Aronix M8030 (trade name)
average viscosity of 1000 cP/25° C.
terminated with acrylic acid
constituents: acrylic acid/polyhydric alcohol/polybasic carboxylic acid

I claim:

1. A weather-resistant polyacetal resin composition comprising:
   (A) a polyacetal base resin;
   (B) between 0.01 to 5% by weight, based on the total weight of the composition, of a weathering stabilizer which is at least one compound selected from the group consisting of benzotriazoles, benzophenones, aromatic benzoates, cyanoacrylates, oxanilides and hindered amines; and
   (C) between 0.01 to 10% by weight, based on the total weight of the composition, of an acrylic-terminated polyester oligomer represented by the general formula:

A—(M—N)$_n$—M—A wherein A represents a residue of an acrylic acid or a derivative thereof, M represents a dihydric alcohol residue, N represents a dicarboxylic acid residue, and n is an integer between 1 and 100.

2. A weather-resistant polyacetal resin composition as set forth in claim 1, wherein said acrylic-terminated polyester oligomer exhibits a viscosity of 20000 cP or below at 25° C.

3. A weather-resistant polyacetal resin composition comprising a polyacetal base resin, and a weather-resistant effective amount of a weather-stabilizing package consisting essentially of:
   (i) between 0.01 to 5% by weight, based on the total weight of the composition, of a weather stabilizer which is at least one selected from the group consisting of benzotriazoles, benzophenones, aromatic benzoates, cyanoacrylates, oxanilides and hindered amines; and
   (ii) between 0.01 to 10% by weight, based on the total weight of the composition, of an oligomer which is an ester of a dihydric or higher alcohol with a dibasic or higher carboxylic acid terminated with a residue of acrylic acid or derivatives thereof.

4. A weather-resistant polyacetal resin composition as in claim 3, wherein said oligomer is represented by the general formula:

A—(M—N)$_n$—M—A wherein A is a residue of an acrylic acid or a derivative thereof, M is a dihydric or higher alcohol residue, N is a dicarboxylic or higher acid residue, and n is an integer between 1 and 100.

5. A weather-resistant polyacetal resin composition as in claim 3 or 4, wherein said oligomer exhibits a viscosity of 20000 cP or less at 25° C.

6. A molded article which consists essentially of the weather-resistant polyacetal resin composition as in claim 3 or 4.

* * * * *

UNITED STATES PATENT AND TRADEMARK OFFICE
CERTIFICATE OF CORRECTION

PATENT NO. : 5,079,282

DATED : January 7, 1992

INVENTOR(S) : Sadatsugu OKUDA

It is certified that error appears in the above-identified patent and that said Letters Patent is hereby corrected as shown below:

```
Under Abstract, first line, after "in" delete "the";
           line 7, after "an" delete "acrylic oligomer of a polyester
           type" and insert --acrylic-terminated polyester oligomer--.

Column 1, line 20, after "mechanical" insert --and--;
          line 21, after "heat" insert --)--;
          line 22, after "which" delete "a" and after "utilized" change
"expand" to --expands--;
          line 28, after "of" delete "a";
          line 29, delete "determinate" and insert --deteriorate--;
          line 31, after "atmosphere" change "weathering" to --Weathering--;
          line 41, after "articles" insert --of--;
          line 52, after "stabilizer" delete "is" and insert --are--;
          line 55, after "bleed" change "into" to --onto--;
          line 56, after "excess" delete "the";
          line 59, after "resin" delete ". This invention affects" and
insert --, thereby affecting--
          line 61, after "result" insert --, the--;
          line 62, after "efficiency" delete "that other various troubles";
          lines 63 and 64, delete these lines in their entirety.

Column 2, line 16, after "resin" delete "and";
          line 24, after "(B)" insert --one--.

Column 4, line 41, after "oligomers" change "includes" to --onclude--;
          line 55, after "base" change "is resins" to --resins is--.

Column 5, line 47, change "simultaneous" to --simultaneously--;
          line 65, after "the" delete "of";
          line 66, before "tensile" delete "lower".
```

UNITED STATES PATENT AND TRADEMARK OFFICE
CERTIFICATE OF CORRECTION

PATENT NO. : 5,079,282

DATED : January 7, 1992

INVENTOR(S) : Sadatsugu Okuda

It is certified that error appears in the above-identified patent and that said Letters Patent is hereby corrected as shown below:

Column 6, line 1, after "the" delete "weather-resistance polyacetal" to --weather-resistant polyacetal--.

Signed and Sealed this

Twenty-seventh Day of April, 1993

Attest:

MICHAEL K. KIRK

Attesting Officer  Acting Commissioner of Patents and Trademarks